United States Patent

Krohn

[15] 3,706,936

[45] Dec. 19, 1972

[54] SELECTIVELY SWITCHED MULTI PURPOSE ELECTRICAL FILTER

[72] Inventor: Earl H. Krohn, Brookline, Mass.

[73] Assignee: Krohn-Hite Corporation, Cambridge, Mass.

[22] Filed: Oct. 28, 1970

[21] Appl. No.: 84,566

[52] U.S. Cl. ........................330/21, 330/31, 330/109

[51] Int. Cl. ................................................H03f 3/04

[58] Field of Search....330/21, 31, 51, 107, 109, 126; 333/70 CR

[56] References Cited

UNITED STATES PATENTS

| | | | |
|---|---|---|---|
| 3,532,908 | 10/1970 | Jennings | 333/70 CR |
| 3,564,122 | 2/1971 | Wise | 330/21 |
| 2,558,868 | 7/1951 | McCarty | 330/126 X |

*Primary Examiner*—Roy Lake
*Assistant Examiner*—Lawrence J. Dahl
*Attorney*—Charles Hieken

[57] ABSTRACT

A universal electronic filter includes a high pass section with an adjustable high cutoff frequency, a low pass section with an adjustable low cutoff frequency and a switching arrangement for interconnecting the two sections to provide high pass operation, low pass operation, band pass or band reject operation, all with adjustable cutoff frequencies. The high pass section includes means for adjusting the gain on one output while keeping it constant on another and applying the output from the constant gain portion to a shunt section to peak at a corner frequency without the peak changing as the gain is adjusted. In the low pass section there is a PNP stage in cascade with an NPN stage with the same number of PNP's as NPN's to cancel d-c drift. In both low and high pass sections the degree of feedback is varied with change in slope. In the low pass section feedback to both collector and emitter with the feedback to the emitter through a capacitor helps keep the section operating at higher frequencies.

9 Claims, 5 Drawing Figures

INVENTOR
EARL H. KROHN
BY
Charles Hieken
ATTORNEY

INVENTOR
EARL H. KROHN
BY
Charles Hieken
ATTORNEY

INVENTOR
EARL H. KROHN

BY
Charles Hieken
ATTORNEY

SELECTIVELY SWITCHED MULTI PURPOSE ELECTRICAL FILTER

BACKGROUND OF THE INVENTION

The present invention relates in general to filtering and more particularly concerns a novel universal electronic filter that may function as a high pass filter, a low pass filter, a band pass filter, or a band reject filter with all cutoff frequencies adjustable. The present invention exhibits good filtering characteristics easily controlled while using reliable solid-state circuitry having a number of features.

It is an important object of this invention to provide a universal filter capable of functioning as a low pass filter, high pass filter, band pass filter, or band reject filter all with adjustable cutoff frequencies while providing means for adjusting the sharpness of the cutoff.

It is a further object of the invention to achieve the preceding object while providing a means for adjusting the gain in one output in the high pass section while keeping it constant on another and applying the constant gain to a shunt section to peak at a corner frequency without the peak changing as the gain is adjusted.

It is a further object of the invention to achieve one or more of the preceding objects with a low pass section that is virtually free from d-c drift.

It is another object of the invention to provide a means for varying the feedback as the filter slope is changed.

It is a further object of the invention to keep the low pass section operating at a relatively high upper limit frequency.

It is a further object of the invention to achieve one or more of the preceding objects with reliable apparatus that is relatively inexpensive.

SUMMARY OF THE INVENTION

According to the invention, there is filtering means having means for selectively adjusting the slope of the transmission characteristic and means for adjusting the feedback as the slope is adjusted. According to another feature of the invention, a high pass section includes means for adjusting the gain in one output while keeping the gain constant on another and applying the latter to a shunt section to peak at a corner frequency near the edge of the transmission band so that the peak does not change as the gain is adjusted. According to still another feature of the invention, the low pass section includes cascaded PNP and NPN stages with the same number of PNP's as NPN's to cancel d-c drift.

Numerous other features, objects and advantages of the invention will become apparent from the following specification when read in connection with the accompanying drawing in which:

DETAILED DESCRIPTION OF PREFERRED EMBODIMENTS

Figures 1, 2:
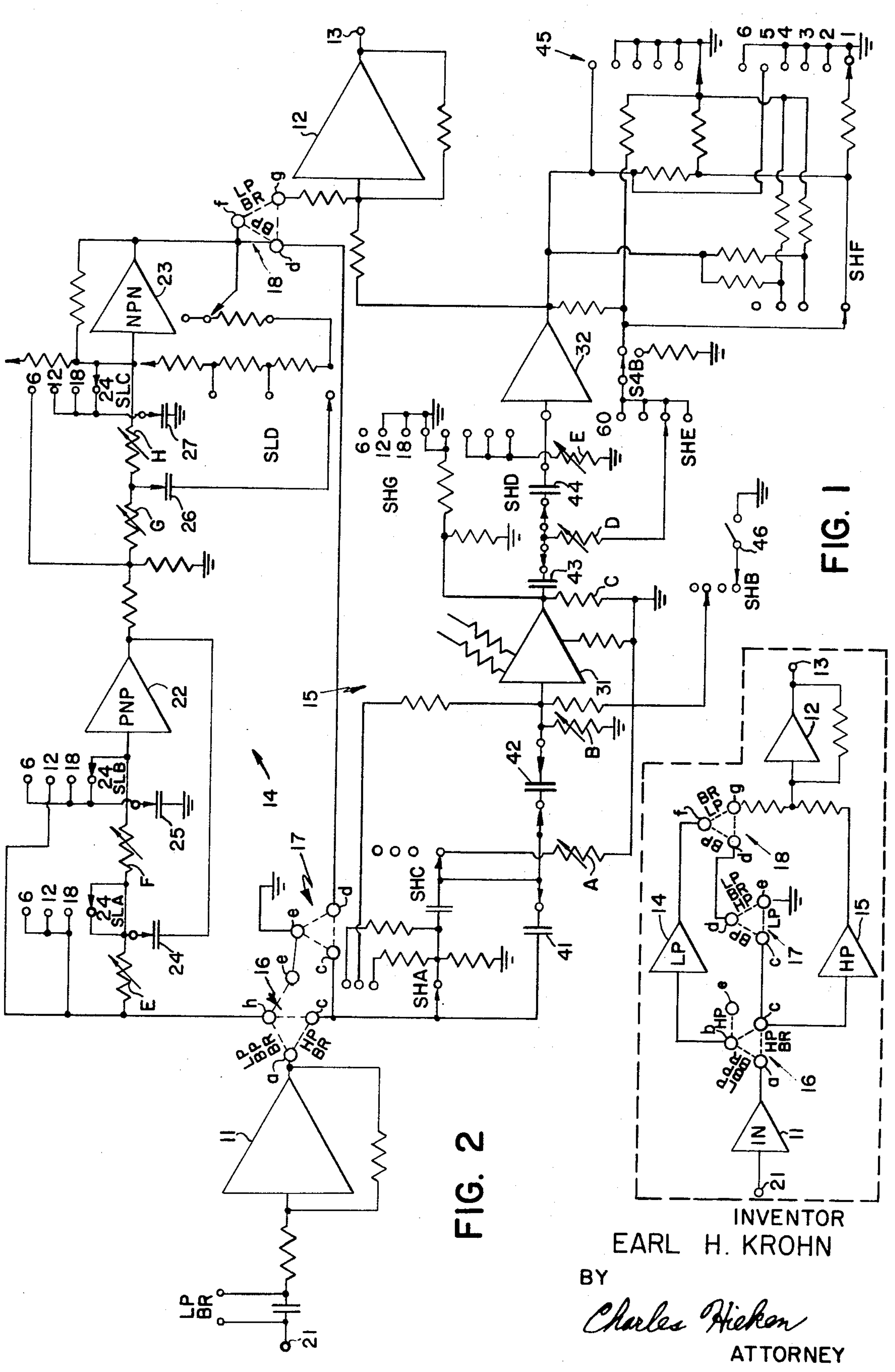
FIG. 1 is a simplified diagram of a filter according to the invention.
FIG. 2 is a combined block-partial schematic circuit diagram illustrating the logical arrangement of a universal filter according to the invention.

With reference now to the drawing, and more particularly FIG. 1 thereof, there is shown the logical arrangement of a system according to the invention to illustrate basic principles involved providing low pass, high pass, band pass and band reject operation. An input signal applied to the input amplifier 11 is amplified by output operational amplifier 12 to provide a signal on output terminal 13 having the selected transmission characteristics. There is a low pass filter section 14, a high pass filter section 15, an input switching junction 16, an intermediate switching junction 17 and an output switching junction 18. The input switching junction 16 includes terminals *a*, *b* and *c*. The intermediate switching junction 17 includes terminals *c*, *d* and *e*. The output switching junction 18 includes terminals *d*, *f* and *g*. The paths between terminals *b* and *c* of input junction 16 and between terminals *d* and *g* of output junction 18 are always open. Consider now the various open and closed paths of the different switching junctions for the different modes of operation. The letters beside a leg between terminals indicate that path is closed for the designated operation with LP, HP, BP and BR designating low pass, high pass, band pass and band reject operation, respectively.

For low pass operation the path between terminals *a* and *b* of input switching junction 16 is closed while that between terminals *a* and *c* is open. Both terminals *c* and *d* of intermediate junction 17 are grounded to grounded terminal *e*. At output junction 18 the path between terminals *d* and *f* is open while that between terminals *f* and *g* is closed. Functionally, this switching arrangement results in the signal applied to input amplifier 11 being transmitted through low pass section 14 and through output amplifier 12 to output terminal 13 while the input of high pass filter section 15 is grounded. By having high pass section 15 continuously coupled to the input of output operational amplifier 12, a number of adjustments that would otherwise be required in conventional arrangements where high pass section 15 would have its output disconnected from the input of output amplifier 12 are reduced.

For high pass operation input junction 16 has the path between terminals *a* and *b* open, that between *a* and *c* closed, and that between *b* and *e* closed. Intermediate switching junction 17 has the paths between terminals *c* and *d* and between terminals *c* and *e* open while that between terminals *d* and *e* is closed. Output junction 18 has the path between terminals *d* and *f* and between *f* and *g* open. The net result of this arrangement is that the signal applied to the input of input amplifier 11 passes through high pass filter section 15 and output amplifier 12 to output terminal 13 while low pass filter section 14 has its input grounded and output disconnected.

For band pass operation, input switching junction 16 has the path between terminals *a* and *b* closed and that between terminals *a* and *c* open. Intermediate junction 17 has the path between terminals *c* and *d* closed and that between terminals *c* and *e* and between *d* and *e* open. Output switching junction 18 has the path between terminals *d* and *f* closed and that between terminals *f* and *g* open. The net result of this arrangement is that low pass filter section 14 is cascaded with high pass filter section 15 between input amplifier 11 and output amplifier 12 to provide the desired band pass operation.

For band reject operation input junction 16 has both the path between terminals *a* and *b* and between *a* and *c* closed. Intermediate switching junction 17 has the paths between terminals *c* and *d* and between terminals *c* and *e* open while that between terminals *b* and *e* is closed. Output switching junction 18 has the path between terminals *d* and *f* open while that between terminals *f* and *g* is closed. The net result of this arrangement is that low pass filter section 14 and high pass section 15 are connected in parallel between input amplifier 11 and output amplifier 12 to reject the band of frequencies between the cutoff frequencies of high pass filter section 15 and low pass filter section 14.

Referring to FIG. 2, there is shown a combined block-partially schematic circuit diagram of a system according to the invention illustrating the slope switches and certain other features of the invention. The same reference symbols identify corresponding elements throughout the drawing where applicable. Input amplifier 11 may comprise a two FET input operational amplifier having unity gain. Input terminal 21 is preferably capacitively coupled to the input of amplifier 11 for band pass and high pass operation with the input capacitor bypassed for low pass and band reject operation. Low pass filter section 14 includes a PNP amplification stage 22 and an NPN amplification stage 23 and associated additional circuit components. Four ganged switch sections, SLA, SLB, SLC and SLD are for selecting slopes of 6, 12, 18 and 24 db per octave of the response at the high end of the low band.

A switch S4A in the feedback path determines whether the output is low Q or maximally flat and is ganged with similar function switch S4B in the high pass section. Adjustable resistances E, F, G and H are ganged and function to provide continuously variable adjustment of the low pass filter section cutoff frequency while capacitors 24, 25, 26 and 27 comprise switchable fixed capacitors selected by a ganged switch that is the band switch.

Slope switches SLA, SLB and SLC function to increase the number of RC sections that are cascaded to effect increasing slope of the frequency response while switch SLD functions to reduce the feedback with decreasing slope so that the frequency of the 3 db down point does not change with changes in selected slope.

High pass section 15 has similar features. It includes a first single FET amplification stage 31 and a second two FET stage 32, the first stage having a gain of one while the second has a gain of 1.2. It includes variable resistances A, B, D and E ganged for continuously adjusting the cutoff frequency and capacitors 41, 42, 43 and 44 comprising a group of capacitors switched by a ganged switch that is the band switch. It also includes slope switches SHA, SHB, SHC, SHD, SHE, SHF and SHG. Switches SHD and SHE decrease the feedback with decreasing slope. The ganged six-throw two-pole switch 45 functions to provide high pass peaking for the different band switch sections with switch 46 being closed on the highest band 6 and resistor C helping to provide peaking for bands 5 and 6. A feature of this aspect of the invention is that FET amplifier 31 provides one output while keeping another output constant and applying the constant output across the peaking resistances, such as resistance C, to peak at a corner frequency that does not change as the gain is adjusted, as described below in connection with FIG. 3B.

Switch S4B functions to select maximally flat gain or low Q gain and is ganged with switch S4A in the low pass section.

Figure 3A:
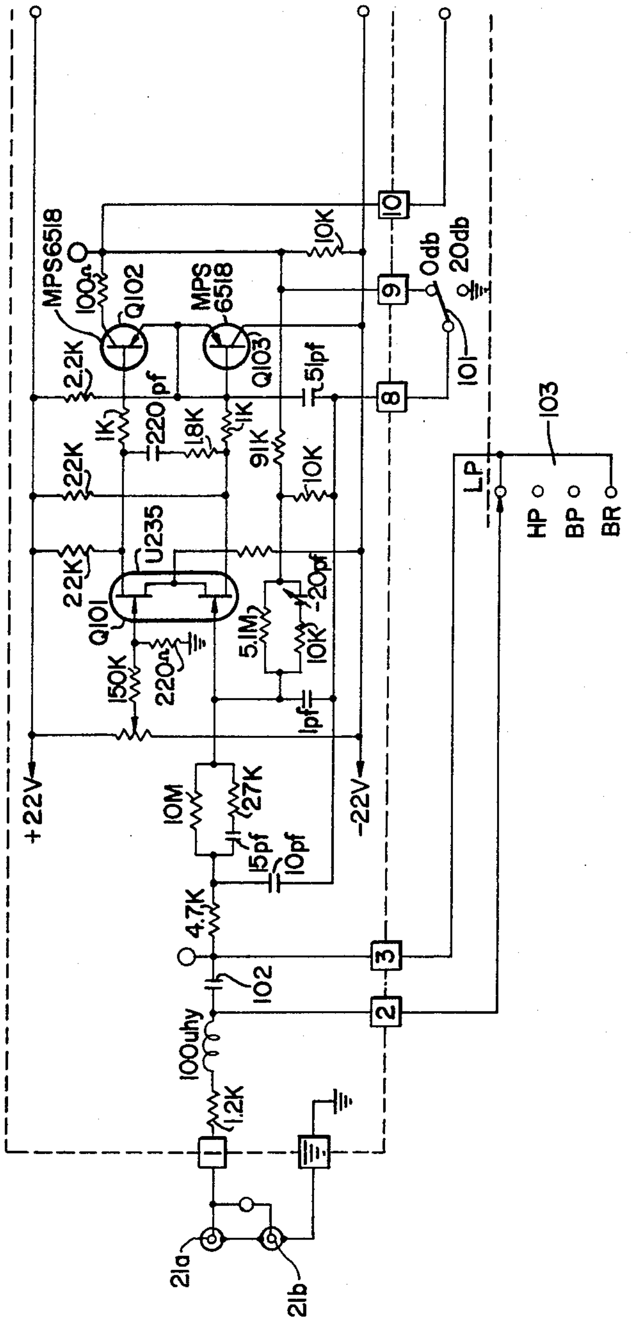
FIG. 3 is a schematic circuit diagram of an exemplary embodiment of the invention.
Figure 3B:
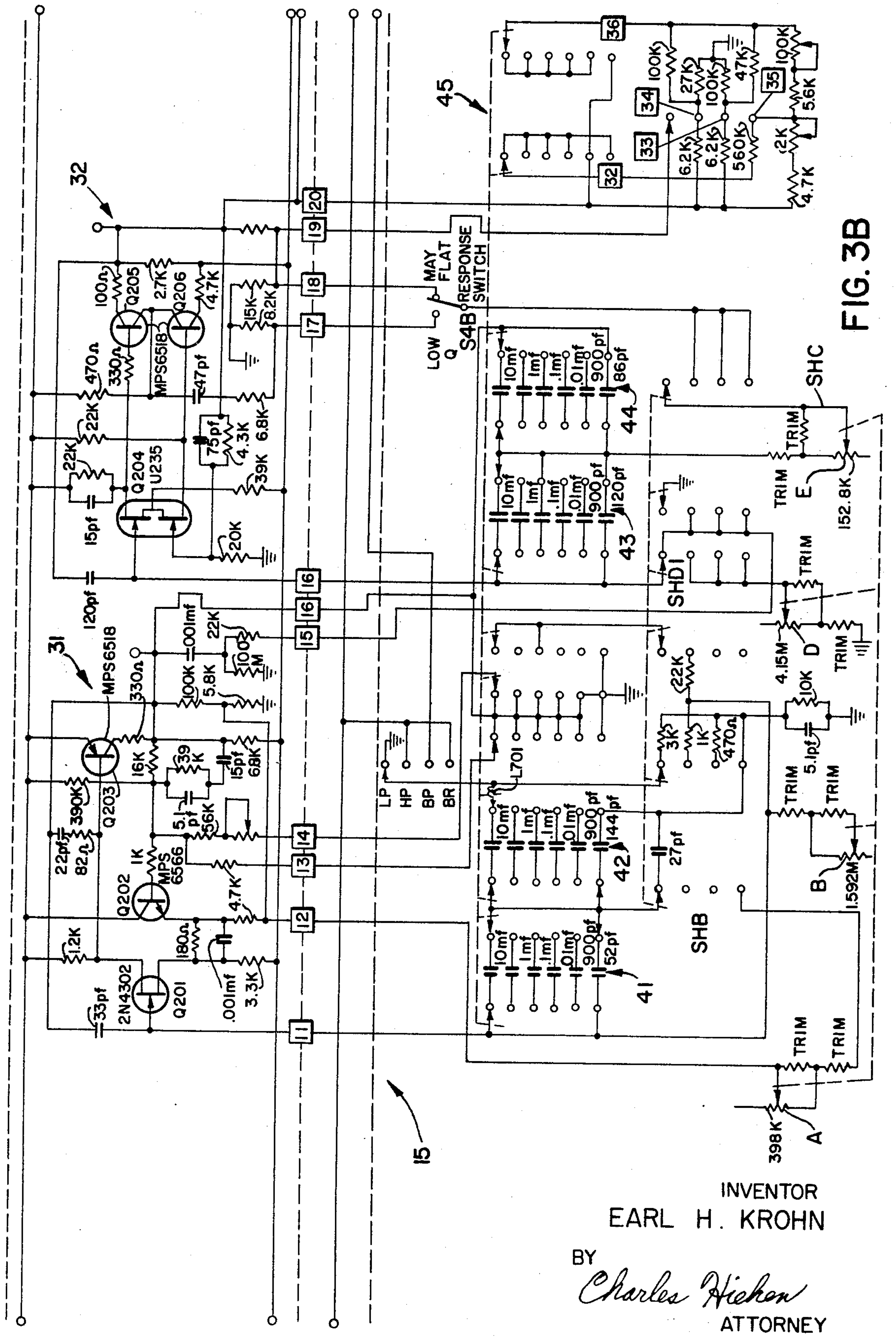
Figure 3C:
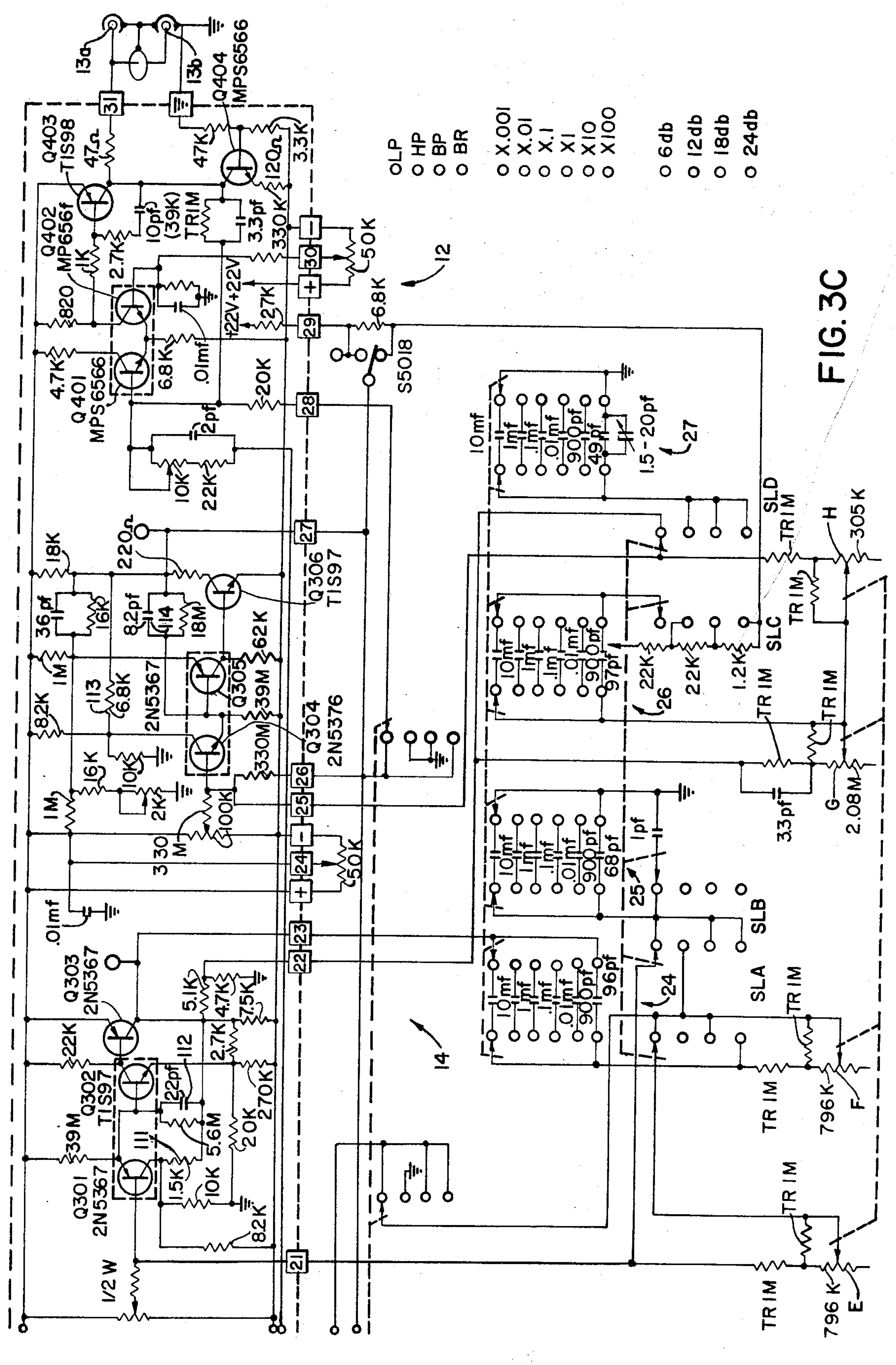

Referring to FIG. 3, there is shown a schematic circuit diagram of an exemplary embodiment of the invention. Since those skilled in the art will be able to practice the invention by building the circuit there fully disclosed, the discussion which follows will avoid describing in detail that which should be apparent to those skilled in the art. FIG. 3 is divided into three portions designated FIG. 3A, FIG. 3B and FIG. 3C to be aligned left to right in that order. The d-c potentials of +22 and −22 volts used in this exemplary embodiment are perferably supplied by a well regulated low impedance d-c power supply.

Input amplifier 11 shown in FIG. 3A comprises a two-FET device Q101, transistors Q102, Q103 and associated components. It preferably includes a gain switch 101 that includes a zero db position for transmitting the input signal with unity gain and a 20 db position for transmitting the input signal with gain of 20 db. Input terminal 21 includes parallel input jacks **21*a* and 21*b* with input coupling capacitor 102 short circuited when function switch section 103** is in the low pass and band reject positions.

The high pass section 15 shown in FIG. 3B comprises a first FET stage 31 and a second two-FET stage 32. The first stage comprises FET device Q201, transistors Q202 and Q203 and associated circuit components. The second stage 32 comprises double FET device Q204, transistors Q205 and Q206 and associated circuit components.

A feature of the first amplification stage 31 is the provision for combining a signal of constant gain on the emitter of transistor Q202 with a signal of variable gain derived from the collector of transistor Q203 upon terminal 12 for effectively increasing the peaking at the corner frequency when the slope switch is in the 24 db position. The result is that the corner frequency does not change as the selected slope changes. The effective loop gain increases at higher frequencies to compensate for the loss in gain caused by stray capacity so that the gain of the instrument is essentially independent of frequency.

The low pass section 14 shown in FIG. 3C includes transistors Q301, Q302 and Q303, comprising PNP section 22 with the first two transistors being PNP and the intermediate transistor being NPN, and associated circuit components. Transistors Q304, Q305 and Q306 comprise NPN stage 23 with associated circuit components with the first and last transistors being NPN and the intermediate one being PNP. By having the same number of PNP transistors as NPN transistors, d-c drift is minimized. Another feature of the invention resides in having feedback from the collector of a transistor in a triplet to both the collector and the emitter of the first transistor of that triplet. Thus, the collector and emitter of transistor Q301 receive feedback from the collector of transistor Q303 through resistor 111 and through means including capacitor 112, respectively. Similarly, the collector and emitter of transistor Q304 receive feedback from the collector of transistor Q306 through resistor 113 and through means including capacitor 114, respectively. This mode of feedback helps enhance the high frequency response of the low pass section.

The minimization of drift is effected by having similar loops with oppositely poled transistors. Thus, each of sections 22 and 23 includes a low current input stage, a higher current intermediate stage and a highest current output stage. Still another feature of this arrangement is that the nearly matching oppositely sensed currents tend to produce a distortion canceling effect.

Output amplifier 12 comprises transistors Q401, Q402, Q403 and Q404. Output terminal 13 may comprise a front output jack 13*a* and a rear output jack 13*b* in parallel to facilitate deriving the output at convenient front and rear locations.

At the right of FIG. 3C is a row of labeled switch positions with the designated positions corresponding to respective taps at the same level in FIGS. 3A, 3B and 3C. The first group of four designates the modes of low pass, high pass band pass and band reject. The next six designate the multiplication factor for the different cutoff frequencies. The last four designate the slope of the frequency response change.

There has been described a novel universal filter characterized by flexibility of operation, excellent electrical performance and an arrangement that facilitates production and reliable use in the field. It is evident that those skilled in the art may now make numerous departures from and modifications and variations of the specific embodiments described herein without departing from the inventive concepts. Consequently, the invention is to be construed as embracing each and every novel feature and novel combination of features present in or possessed by the electrical apparatus and techniques herein disclosed and limited solely by the spirit and scope of the appended claims.

What is claimed is:

1. Electrical filtering apparatus having filter means with at least one adjustable cutoff frequency comprising,
   circuit means having feedback,
   means for adjusting said cutoff frequency,
   means for selectively adjusting the slope of the transmission characteristic of said filter means,
   and means for adjusting said feedback at the same time said slope is adjusted to reduce the feedback with decreasing slope so that the frequency of the 3 db down point does not change with changes in selected slope.

2. Filtering apparatus in accordance with claim 1 and further including a high pass section having circuit means characterized by a pair of outputs with means for keeping the gain on one of said outputs constant and adjusting the gain of the other,
   and means for combining the signal on the constant gain output with that on the variable gain output for peaking at a corner frequency near the edge of the transmission band so that the corner frequency does not change with changes in said variable gain or said slope.

3. Filtering apparatus in accordance with claim 1 and further including a low pass section including cascaded PNP and NPN stages with the same number of PNP as NPN devices for providing essentially zero d-c drift in said low pass section.

4. Filtering apparatus in accordance with claim 1 capable of low pass, high pass, band pass and band reject operation comprising,
   an input terminal,
   means defining input, intermediate and output junctions,
   an output terminal,
   a low pass section,
   a high pass section,
   means for continuously coupling the output of said high pass section to said output terminal,
   means including said intermediate junction for grounding the input of said high pass section when said filtering means is in the low pass mode,
   means including said input junction for coupling said input terminal to the input of said high pass section when in the high pass and band reject mode,
   means including said input junction for coupling said input terminal to said input of said low pass section when in said low pass, band pass and band reject mode,
   means including said output junction and said intermediate junction for coupling the output of said low pass section to the input of said high pass section when in said band pass mode,
   and means including said output junction for coupling the output of said low pass section to said output terminal when in the band reject and low pass mode.

5. Filtering apparatus in accordance with claim 4 and further comprising means for grounding the input of said low pass section when in said high pass mode.

6. Filtering apparatus in accordance with claim 2 and further including a low pass section including cascaded PNP and NPN stages with the same number of PNP as NPN devices for providing essentially zero d-c drift in said low pass section.

7. Filtering apparatus in accordance with claim 6 capable of low pass, high pass, band pass and band reject operation comprising,
   an input terminal,
   means defining input, intermediate and output junctions,
   an output terminal,
   a low pass section,
   a high pass section,
   means for continuously coupling the output of said high pass section to said output terminal,
   means including said intermediate junction for grounding the input of said high pass section when said filtering means is in the low pass mode,
   means including said input junction for coupling said input terminal to the input of said high pass section when in the high pass and band reject mode,
   means including said input junction for coupling said input terminal to said input of said low pass section when in said low pass, band pass and band reject mode,
   means including said output junction and said intermediate junction for coupling the output of said low pass section to the input of said high pass section when in said band pass mode, and means including said output junction for coupling the output of said low pass section to said output terminal when in the band reject and low pass mode.

8. Filtering apparatus in accordance with claim 1 wherein said circuit means comprises a low pass section having an amplification loop with at least an input transistor and an output transistor and means for feeding back a portion of the signal on the collection of said output transistor to both the collector and emitter of said input transistor.

9. Filtering apparatus in accordance with claim 3 wherein said low pass section comprises first and second cascaded amplification loops having corresponding similar transistor amplification stages but with transistors of opposite types so that said cascaded loops coact to provide essentially zero d-c drift and a distortion cancelling effect.

* * * * *